Nov. 1, 1955  J. FREY  2,722,052
SHEARING MACHINE
Filed June 2, 1955  2 Sheets-Sheet 1

INVENTOR.
John Frey.
BY
Wayne S Gerber
ATTORNEY

United States Patent Office 2,722,052
Patented Nov. 1, 1955

2,722,052

SHEARING MACHINE

John Frey, Plain City, Ohio

Application June 2, 1955, Serial No. 512,621

6 Claims. (Cl. 30—215)

This invention relates to a shearing machine, and more particularly to a reciprocating type of shear for shearing or cutting wool from sheep. In general, the invention comprises a shear of the type stated having a bottom stationary comb and a pair of reciprocating cutters.

It has been found that it is desirable in shearing sheep to leave about one-quarter inch of wool stubble on the sheep after they are sheared. This stubble protects the sheep from the cold and sudden changes in temperature when shearing is done in the early spring or late fall months. It also prevents sunburn in hot climates; results in fewer cuts from shearing; and enables fattening lambs to be sold sooner after shearing.

The presently available shears, however, are not satisfactory for this purpose. Shears, as now used, have a bottom comb which is stationary and a reciprocably mounted cutter positioned over the bottom comb which is driven either electrically or manually. The closeness of the cut to the skin depends upon the thickness of the comb. In order to have a shear that will not cut too close to the skin, it has been customary to use a special thick or high runner type of comb. This type of shear has not proved to be satisfactory, although it will leave approximately the right amount of wool stubble, because of its thickness it cannot enter the heavily matted wool easily nor move through this wool with sufficient speed. It pulls, leaves streaks, and, in general, is too slow in operation.

Accordingly, it is one of the objects of this invention to provide a shear of an improved and novel construction which enters the heavily matted wool easily, operates fast and efficiently without pulling or leaving streaks and which leaves a wool stubble of about one-quarter inch in length.

Another object of this invention is to provide a shear of the type described having a relatively thin bottom comb, which is stationary in mounting, and which is combined with a pair of cutters or combs which are reciprocably driven. An advantage, and novel feature, of this combination of comb and cutters is that the comb or cutter directly above and next to the bottom comb reciprocates in a short arc, which cuts a small amount of wool just sufficient to allow the bottom comb to enter the matted wool far enough for the second or top cutter which operates in a large arc to cut the wool off with the desired length of stubble remaining. This construction provides for operation of the shear without the disadvantages and objections noted in connection with presently available shears.

Other objects and advantages of this invention will be apparent from the following description, appended claims and the drawings.

In the drawings, wherein a preferred embodiment only of the invention is shown:

Figure 1:
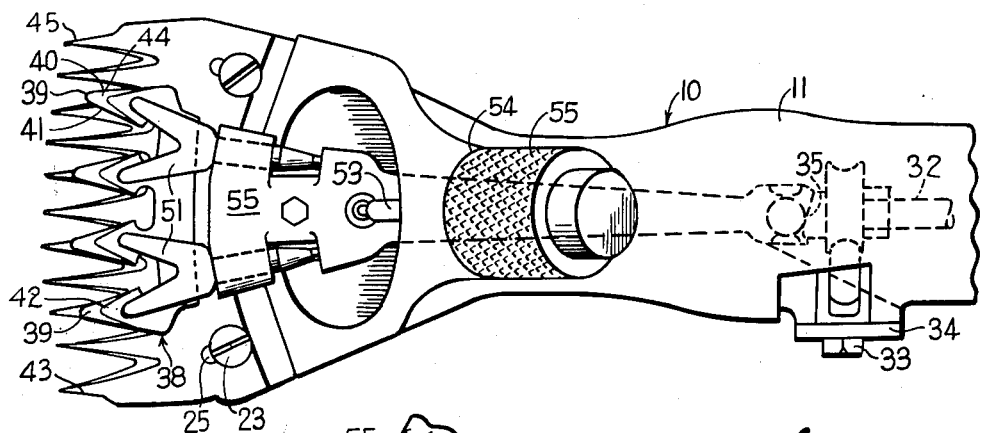
Fig. 1 is a partial, top plan view in elevation of a cutter constructed to incorporate my invention.
Figure 2:
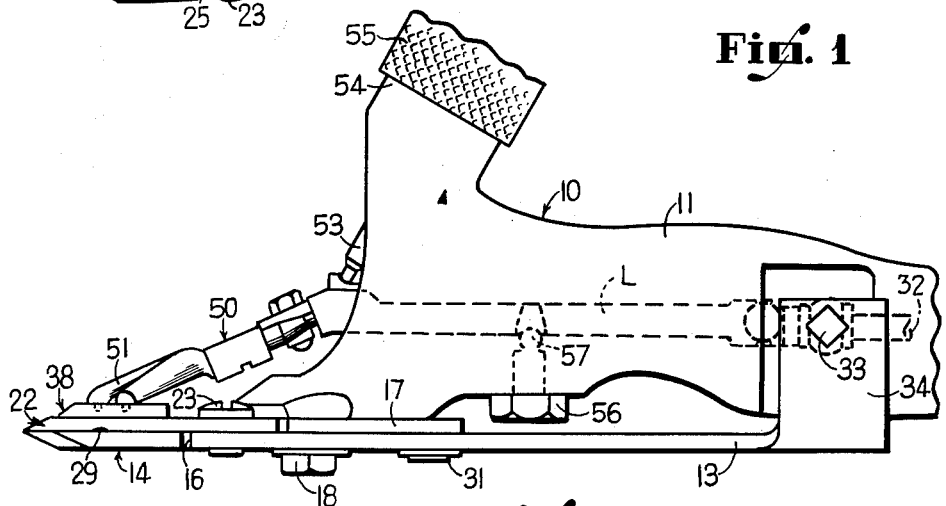
Fig. 2 is a side elevational view of the cutter shown in Fig. 1.
Figure 5:
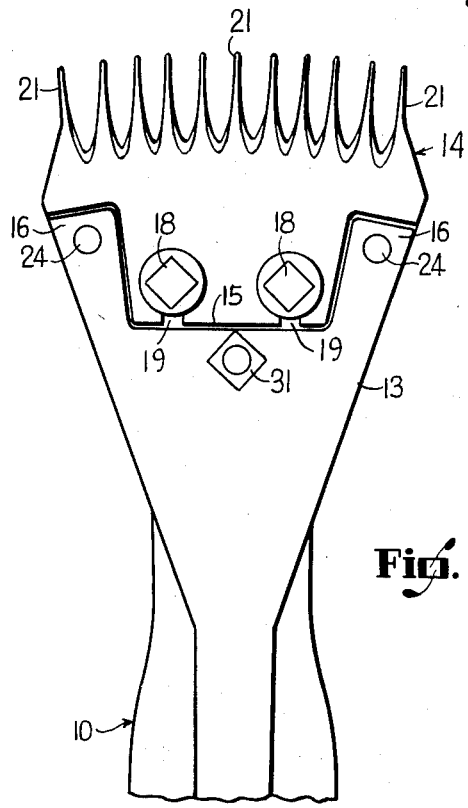
Fig. 5 is a partial, enlarged, bottom plan view in elevation of the bottom or stationary comb and a portion of the pivot arm.

Referring further to the drawings, in Figs 1 and 2 a shear, indicated generally at 10, is shown which is constructed in accordance with my invention. The hand piece or body portion 11 carries an elongated pivot arm 13 having a forked end. The bottom or stationary comb 14 has an end portion 15 which extends back between the forked ends 16 of the pivot arm 13, as seen most clearly in Figs. 2 and 5. Comb 14 is attached to a plate 17, forming an integral part of the hand piece 11, by a pair of small bolts 18—18. As shown in Fig. 5, end 15 of the comb 14 is formed with a pair of slots 19 through which the bolts 18 extend. These slots provide for adjusting the position of comb 14 with respect to the end of the pivot arm 13. A plurality of teeth 21 are formed on the comb 14 in the usual manner and which are adapted to extend to engage the substance to be sheared or cut.

Figure 4:
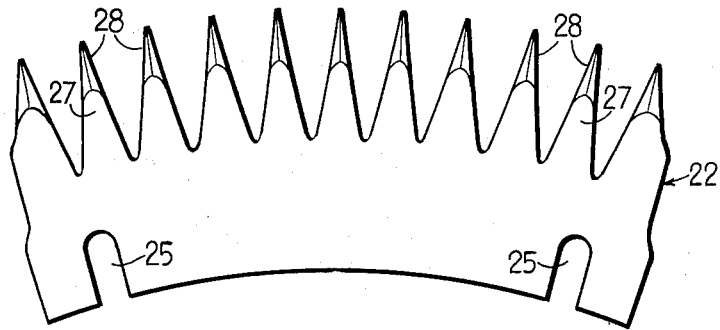
Fig. 4 is a view similar to Fig. 3 of the second or intermediate cutter.

A cutter 22, as shown most clearly in Figs. 2 and 4, is slidably mounted on top of the comb 14, as shown, for reciprocating motion relative to the comb 14, being attached to the ends 16 of the pivot arm 13 by a pair of small screws 23—23 which are threaded into the holes 24—24 formed in the pivot arm 13. Slots 25 are formed in the rear edge of cutter 22, Figs. 1 and 4. The screws 23—23 extend through the slots 25, which provide for adjusting the position of the cutter 22 with respect to the comb 14. The cutter 22 is also provided with a plurality of teeth 27 having cutting edges on both sides of each tooth, as indicated at 28 in Fig. 4. The teeth 27, in general, match in number and align over the teeth 21 in the comb 14.

Figure 6:
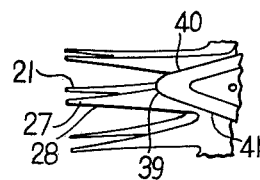
Fig. 6 is a partial, top plan view in elevation showing the travel of the second or intermediate cutter in relation to the bottom comb.

In operation, the comb 14 is adjusted with respect to the cutter 22 so that the teeth 21 of the comb 14 extend slightly out beyond the tips of the teeth 27 of the cutter 22, as seen most clearly in Fig. 6. The teeth 27 move in an arc of about ⅛ of an inch with respect movement of the teeth 27 and cutter 22 with relation to to the teeth 21. This relatively small reciprocating movement of the teeth 27 and cutter 22 with relation to the teeth 21 of the stationary comb 14 and the relative position of the comb and cutter provides for a cut of predetermined width and depth in the wool, and which is sufficient to allow the bottom comb 14 to enter the wool far enough for the top cutter 38 to engage the wool and cut it off, as will be more fully described hereafter. A small groove, indicated at 29 in Fig. 2, is provided in cutter 22 which prevents wool fibers from being wedged between the cutter 22 and the comb 14 past the point of shearing action of these members.

Means are provided for imparting reciprocating movement to the cutter 22 which includes the pivot arm 13 which has a pivotal connection to the plate 17 through the pin 31. Power is transmitted to reciprocate the pivot arm 13 from the main drive shaft 32, Figs. 1 and 2, which is connected in the usual manner to an electric motor, not shown. The pivot arm 13 is connected to the drive shaft 32 by a bolt 33 which extends through the upper part of collar portion 34, Fig. 2, which forms an integral part of the pivot arm 13. Bolt 33 engages a cam 35 (Fig. 1) carried on the drive shaft 32 which provides for imparting reciprocating motion to the pivot arm in the usual manner. However, since this construction feature is of a conventional nature further detailed description is not required. A coil spring, not shown, may also be used if desired to provide for securing a tighter driving engagement between the cam 35 and the pivot arm 13.

Figure 7:
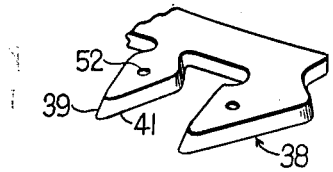
Fig. 7 is a partial, perspective view of the top cutter.
Figure 3:
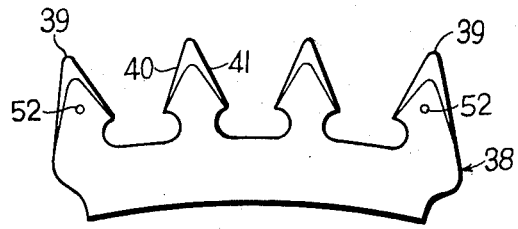
Fig. 3 is an enlarged top plan view in elevation of the top cutter.

The top cutter 38 in the preferred form, shown most clearly in Figs. 3 and 7, has four teeth 39 each having a double cutting edge as indicated at 40 and 41 (Fig. 3). The teeth 39, as shown, are substantially wider and fewer in number than the teeth on cutter 22 and provide a shearing action relative to the teeth on cutter 22. However, the number of the teeth 39 may be increased or decreased, for example, if desired. It will be understood, of course, that if the number of teeth 39 is increased the distance between the teeth will be decreased accordingly. Cutter 38 is slidably mounted on top of cutter 22, as shown for reciprocating motion relative to cutter 22. In operation, the cutter 38 moves back and forth i. e. reciprocates in an arc across the entire length of cutter 22. Thus, referring to Fig. 1 for illustration, the extreme end tooth portion, indicated at 42, of cutter 38 extends over the end tooth portion, indicated at 43, of cutter 22 at one end of the stroke of cutter 38 relative to cutter 22. When cutter 38 reaches the other end of its stroke, its end tooth portion indicated at 44, extends over or covers the end tooth portion of cutter 22, indicated at 45. The operation of the cutters 22 and 38 is such that, for example, as the cutter 22 reciprocates or moves to the left in its cutting cycle the cutter 38 moves to the right in its cutting cycle and vice versa. The cutting arc of cutter 38 is thus wider than the cutting arc of cutter 22 and thus makes a wider cut in the wool. Since the cutter 38 swings in a wider arc than cutter 22 and is mounted in a position above and back from the leading edge of cutter 22, as shown it makes a second cut in the wool or substance being sheared which extends the width and depth of the first cut made by the cutter 22.

Means for reciprocably driving the cutter 38 includes a tensioning member, indicated generally at 50, which has fingers 51 which press down on the cutter 38 to hold it in position. The undersides of the fingers 51 are provided with short pins, not shown, which project into small drill holes, indicated at 52 (Figs. 3 and 7), and which serve to hold cutter 38 in position. The tensioning member 50 includes a shaft 53 which is mounted in a threaded collar 54 having a knurled finger piece 55 which provides for adjusting the pressure or tension exerted by the shaft 53 on the fingers 51. The main drive shaft 32 drives an oscillating lever L which is pivotally connected to the bolt 56, as indicated at 57 in Fig. 2, and provides for imparting reciprocating motion to drive the cutter 38 as described.

From the above description and drawing it will be understood that the thickness of the bottom or stationary comb, as well as that of the two cutters can be varied to secure a cut leaving a height of stubble which is desired. The novel construction of a shear having a thin stationary comb cooperating with a pair of reciprocably mounted cutters produces a faster, safer and more economical shearing action for sheep and the like than heretofore possible.

From the above description and the drawings, it will be apparent that the construction disclosed will accomplish the objects and advantages set forth as well as others. It is also to be understood that the embodiments of the invention described, shown and claimed herein constitute preferred forms only, and that other forms might be adopted, all of which come within the scope of the appended claims.

Having thus disclosed my invention, what I claim is:

1. A shearing machine of the type described including a stationary comb having a plurality of teeth which extend to engage the substance to be sheared, a cutter positioned above said comb having teeth which provide a shearing action with respect to the teeth of said comb, a second cutter positioned above the first said cutter having teeth which provides a shearing action with respect to the teeth of said first cutter, and means for driving both said cutters to provide said shearing action.

2. A shearing machine of the type described including a stationary comb having a plurality of teeth which extend to engage the substance to be sheared, a cutter positioned above said comb and reciprocably mounted relative to said comb having the same number of teeth thereon as on said comb and which provide a shearing action relative to the teeth of said comb, a second cutter positioned above the first said cutter and reciprocably mounted relative to the first said cutter having teeth thereon which are substantially wider and fewer in number than the teeth on the first said cutter and which provide a shearing action relative to the teeth on the first said cutter, and means for reciprocably driving both said cutters to provide said shearing action.

3. A shearing machine of the type described including a stationary comb having a plurality of teeth which extend to engage the substance to be sheared, a cutter positioned above said comb having teeth which provide a shearing action with respect to the teeth of said comb, said cutter being positioned in relation to said comb so that the teeth of said comb project outwardly beyond the tips of the teeth on the cutter, a second cutter positioned above the first said cutter having teeth which provides a shearing action with respect to the teeth of said first cutter, said second cutter being positioned in relation to the first said cutter so that the teeth of the first said cutter project outwardly beyond the tips of the teeth on the second cutter, and means for driving both said cutters to provide said shearing action.

4. A shearing machine of the type described including a stationary comb having a plurality of teeth which extend to engage the substance to be sheared, a cutter positioned above said comb having teeth which provide a shearing action with respect to the teeth of said comb, said cutters being positioned back from the leading edge of said comb so that the comb first enters the substance to be sheared, a second cutter positioned above the first said cutter having teeth which provides a shearing action with respect to the teeth of said first cutter, said second cutter being positioned back from the leading edge of the first said cutter so that the comb and first said cutter enter the substance to be sheared and make a cut before the second cutter enters said substance, and means for driving both said cutters to provide said shearing action.

5. A shearing machine of the type described including a stationary comb having a plurality of teeth which extend to substance to be sheared, a cutter positioned above said comb having cutting teeth which reciprocate in an arc with respect to the teeth in said comb and provide for making a first cut in said substance, a second cutter having cutting teeth which reciprocate in an arc with respect to the teeth in the first said cutter and in a position above the first said cutter so that a second cut is made which extends the depth of said first cut, and means for reciprocably driving both said cutters to provide for said cutting action.

6. A shearing machine of the type described including a stationary comb having a plurality of teeth which extend to engage the substance to be sheared, a cutter having cutting teeth which reciprocate in an arc with respect to the teeth in said comb and in a position above and back from the leading edge of said comb so that a cut of predetermined width and depth is made in said substance, a second cutter having cutting teeth which reciprocate in a wider arc than the arc of said first cutter and in a position above and back from the leading edge of said first cutter so that a second cut is made in said substance which extends the width and depth of said first cut, and means for reciprocably driving both said cutters to provide for said cutting action.

No references cited.